(12) United States Patent
Maksymovych (10) Patent No.: US 9,267,851 B2
(45) Date of Patent: Feb. 23, 2016

(54) SINGLE-CONTACT TUNNELING THERMOMETRY

(71) Applicant: UT-Battelle, LLC, Oak Ridge, TN (US)

(72) Inventor: Petro Maksymovych, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 403 days.

(21) Appl. No.: 13/898,659

(22) Filed: May 21, 2013

(65) Prior Publication Data

US 2014/0003466 A1 Jan. 2, 2014

Related U.S. Application Data

(60) Provisional application No. 61/666,322, filed on Jun. 29, 2012.

(51) Int. Cl.
*G01K 7/00* (2006.01)
*G01K 7/02* (2006.01)
*G01Q 60/12* (2010.01)

(52) U.S. Cl.
CPC ............. *G01K 7/021* (2013.01); *G01K 7/028* (2013.01); *G01Q 60/12* (2013.01)

(58) Field of Classification Search
CPC combination set(s) only.
See application file for complete search history.

(56) References Cited

U.S. PATENT DOCUMENTS

| | | | |
|---|---|---|---|
| 6,491,425 B1 | 12/2002 | Hammiche et al. | |
| 6,518,872 B1 * | 2/2003 | Edinger et al. | 338/25 |
| 7,091,476 B2 * | 8/2006 | Kley | 250/234 |
| 7,514,678 B2 | 4/2009 | Yao et al. | |
| 2003/0094655 A1 * | 5/2003 | Pekola et al. | 257/347 |

OTHER PUBLICATIONS

D. G. Cahill, W. K. Ford, K. E. Goodson, G. D. Mahan, A. Majumdar, H. J. Maris, R. Merlin, and S. R. Phillpot, "Nanoscale Thermal Transport"; pp. 793-818; Jan. 15, 2003; Journal of Applied Physics 93.
A. A. Balandin,"Nanoscale Thermal Management"; pp. 11-15; Feb./Mar. 2002; IEEE Potentials.
A. Majumdar, "Scanning Thermal Micrscopy"; pp. 505-585; 1999; Annual Review of Materials Science 29.

(Continued)

*Primary Examiner* — Lisa Caputo
*Assistant Examiner* — Nasir U Ahmed
(74) *Attorney, Agent, or Firm* — Brinks Gilson & Lione (57) ABSTRACT

A single-contact tunneling thermometry circuit includes a tunnel junction formed between two objects. Junction temperature gradient information is determined based on a mathematical relationship between a target alternating voltage applied across the junction and the junction temperature gradient. Total voltage measured across the junction indicates the magnitude of the target alternating voltage. A thermal gradient is induced across the junction. A reference thermovoltage is measured when zero alternating voltage is applied across the junction. An increasing alternating voltage is applied while measuring a thermovoltage component and a DC rectification voltage component created by the applied alternating voltage. The target alternating voltage is reached when the thermovoltage is nullified or doubled by the DC rectification voltage depending on the sign of the reference thermovoltage. Thermoelectric current and current measurements may be utilized in place of the thermovoltage and voltage measurements. The system may be automated with a feedback loop.

24 Claims, 5 Drawing Sheets

(56) References Cited

OTHER PUBLICATIONS

B. Cretin, S. Gomes, N. Trannoy, and P. Vairac, "Scanning Thermal Microscopy"; pp. 181-238; 2007; Microscale and Nanoscale Heat Transfer, Topics Appl. Physics 107.

N. Barbosa and A. J. Slifka, Spaltially and Temporally Resolved Thermal Imaging of Cyclically Heated Interconnects by Use of Scanning Thermal Microscopy; pp. 579-584; Feb. 7, 2008; Microscopy Research and Technique 71.

S. Gomès, L. David, V. Lysenko, A. Descamps, T. Nychyporuk, and M. Raynaud, "Application of Scanning Thermal Microscopy for Thermal Conductivity Measurements on Meso-Porous Silicon Thin Films"; pp. 6677-6683; Sep. 7, 2007; Journal of Physics D: Applied Physics 40.

J. Christofferson, K. Maize, Y. Ezzahri, J. Shabani, X. Wang, and A. Shakouri, "Microscale and Nanoscale Thermal Characterization Techniques"; pp. 3-9; Jan. 3-6, 2007; Thermal Issues in Emerging Technologies, THETA 1, Cairo, Egypt.

F. Menges, H. Riel, A. Stemmer, and B. Gotsmann, "Quantitative Thermometry of Nanoscale Hot Spots"; pp. 596-601; Jan. 3, 2012; Nano Letters 12, ACS Publications.

P. Reddy, S.-Y. Jang, R. A. Segalman, and A. Majumdar, "Thermoelectricity in Molecular Junctions"; pp. 1568-1571; Mar. 16, 2007; Science, V 315.

A. Volokitin and B. Persson, "Near-Field Radiative Heat Transfer and Noncontact Friction"; pp. 1291-1329; Oct.-Dec. 2007; Reviews of Modern Physics 79.

J. Stövneng and P. Lipavský, "Thermopower in Scanning-Tunneling-Microscope Experiments"; pp. 9214-9216; Nov. 15, 1990; Physical Review B V42.

* cited by examiner

SINGLE-CONTACT TUNNELING THERMOMETRY

CROSS REFERENCE TO RELATED APPLICATION

This application makes reference to and claims priority to U.S. Provisional Application No. 61/666,322 filed on Jun. 29, 2012, which is incorporated by reference in its entirety.

STATEMENT REGARDING FEDERALLY FUNDED RESEARCH AND DEVELOPMENT

The United States Government has rights in this invention pursuant to contract no. DE-AC05-000R22725 between the United States Department of Energy and UT-Battelle, LLC.

BACKGROUND OF THE INVENTION

1. Technical Field

This invention relates to tunneling thermometry, and more particularly, to single contact tunneling thermometry.

2. Related Art

Although temperature measurements on the micro- and nanoscale are greatly challenging, they are vitally important in a large number of technological processes. Power dissipation on the scale of single nanoscale electronic elements may be a limiting factor in both future scaling of microelectronic elements and their operation at higher clock-frequencies and in confined environments. Micro- and nanoscale temperature measurements are the foundation of thermal microscopy, which is a highly versatile technique that can address power dissipation and local heating effects in conducting materials, junctions and interconnects, and may prospectively be used for optical and biological applications. Having a knowledge of temperature gradients across a material (derived from temperature maps), across an interconnect, or across a point-contact junction may lead to qualitative and quantitative estimates of thermal conductivity, which is a fundamentally important property for a wide variety of electronic and energy applications. Finally, nanoscale thermometry is a platform for fundamental discoveries in thermal transport and electron-phonon interactions, both of which need to be optimized for the design of efficient thermoelectric energy harvesting, electronic refrigeration and thermal management in microscale and nanoscale systems.

The most advanced optical methods for thermal measurements, relying on spectroscopy of infrared photons, may only provide a resolution on the order of 1 micrometer. Therefore, today, the absolute majority of nano- and microscale temperature measurements are carried out using point-contact techniques, broadly termed Scanning Thermal Microscopy, which rely on miniaturized thermocouples or resistive thermometers. Such measurements are typically carried out by bringing a thermal probe into a good mechanical and, crucially, a good thermal contact with a sample of interest and reading out the local temperature from the electronic response of the thermal probe (typically thermovoltage of the thermocouple, electrical resistance of a resistive thermometer such as a Wollaston probe, or local power dissipation). The probe may be raster-scanned across the surface of the heated material to map out local temperature variations. A documented resolution of such techniques is ~50 nm.

Scanning Thermal Microscopy utilizes two electrical leads that come to a junction, and it is at this junction that the thermal-electronic signal will be generated. Although the point of mechanical contact to the surface can then be extended beyond the junction of the two wires, and further miniaturized, the mere fact of requiring two separate wires precludes efficient downsizing of the probe as a whole, or its integration with microelectronic devices, micro- and nano-electromechanical systems, and other related technologies.

An even more serious limitation of making a physical contact to measure local temperature is that, in contrast to macroscopic thermocouples, the temperature sensors in micro- and nanoscale contact thermometry may not equilibrate with the surface of interest. Any of these three scenarios may apply: (1) the thermal resistance of the point contact may be larger (for metal contacts $\sim 10^7$ K/W) than that of the thermometer leads ($\sim 10^5$ K/W), in which case one should consider explicitly the flow of heat from the temperature sensor to the object of interest. This may be a very complicated problem to treat quantitatively because of the lack of detailed knowledge of the contact geometry and the resulting thermal boundary resistances. Typically, one may rely on a calibration of the method using objects with known temperatures, or a theoretical modeling of the problem, both of which are not only time consuming, but also prone to their own errors. Moreover, temperature equilibrium may be amplified with diminishing size of the two-terminal temperature probe. (2) The opposite may be true: the thermal resistance of the point contact may be poor such as in the case of bad physical contact. In this case, the sensor may equilibrate but the temperature reading may not be accurate, and also not sufficiently sensitive (depending on exact parameters). (3) The size of the measured object is smaller than the size of the probe (e.g. nanoparticles, lithographic patterns etc.) In this case the sensor itself will introduce too much perturbation, altering the temperature of the object and producing flawed measurements.

SUMMARY

In accordance with a method and system for single-contact tunneling thermometry, a circuit comprises a first object and a second object and a tunnel junction formed between the first object and the second object. A target alternating (AC) voltage is applied across the tunnel junction. The magnitude of the target AC voltage may be indicated by a total voltage measured across the tunnel junction or a total current crossing the tunnel junction. Temperature difference information across the tunnel junction may be determined directly from a mathematical relationship between the magnitude of the target AC voltage and the temperature difference across the tunnel junction.

In accordance with one aspect of the system, an electron tunnel junction may be formed between an object for which temperature information may be determined, and a single measurement lead. A temperature gradient may be induced across the tunnel junction. A thermovoltage across the tunnel junction may be measured at zero applied alternating voltage. The thermovoltage may be used as a reference. An alternating voltage may be applied across the junction while simultaneously measuring the total voltage across the tunnel junction. The alternating voltage may impart a DC rectified voltage across the tunnel junction. The magnitude of alternating voltage may be increased until the total voltage across the tunnel junction is nullified or becomes twice the magnitude of the thermovoltage. Properties of the junction and/or the direction of the temperature gradient may determine whether to nullify or double the reference value. The direction of the temperature gradient may depend on whether the probe is hotter or colder than the measured object. In instances when a rectified voltage created by the applied alternating voltage is opposite in sign to the thermovoltage, the procedure is to nullify the thermovoltage. In instances when the rectified voltage has the same sign as the induced thermovoltage, the procedure is to double the thermovoltage. A mathematical formula (equation 4 below) may be applied to the magnitude of the applied alternating voltage to determine the temperature difference between the measurement lead and the object being measured. This method may apply to an electrical resistance across the electron tunnel junction of up to, at least, 10 megaohms (MΩ).

In accordance with another aspect of a system for single-contact tunneling thermometry, an electron tunnel junction may be formed between an object for which temperature information may be determined and a single measurement lead. A temperature gradient may be induced across the electron tunnel junction. Thermoelectric current across the electron tunnel junction may be measured at zero applied alternating voltage. Furthermore, an alternating voltage may be applied across the tunnel junction while the total current across the tunnel junction is simultaneously measured. The alternating voltage may impart a DC rectified bias across the tunnel junction, which in turn imparts a DC rectified current crossing the junction. The magnitude of alternating voltage may be increased until thermoelectric current across the electron tunnel junction is nullified or doubled in value by addition of the DC rectified current. A mathematical formula (equation 4 below) may be applied to the corresponding magnitude of the alternating voltage to determine the temperature difference between the measurement lead and the object being measured. This method may apply to an electrical resistance across the electron tunnel junction of up to, at least, 1 teraohm (TΩ).

In accordance with another aspect of a system for single-contact tunneling thermometry, an electron tunnel junction may be formed between an object for which temperature information may be determined and a single measurement lead. A temperature gradient may be induced across the electron tunnel junction. An alternating voltage may be applied across the electron tunnel junction. A feedback loop may be engaged that may vary the magnitude of an applied alternating voltage to either nullify or double, the value of a reference thermoelectric current measured at zero direct current (DC) bias across the electron tunnel junction or a reference thermovoltage measured at zero DC voltage bias across the electron tunnel junction. The feedback loop may automatically determine whether to nullify or double the net thermovoltage or thermoelectric current value, for example, based on the sign of the rectification thermovoltage or thermoelectric current and the sign of the induced thermovoltage or induced thermoelectric current. A mathematical formula (equation 4 below) may be applied to the magnitude of alternating voltage produced by the feedback loop in to determine the temperature difference between the measurement lead and the object being measured. This method may apply to electrical resistance across the electron tunnel junction of up to, at least, 10 MΩ in instances when the thermovoltage is being measured or up to, at least, 1 TΩ in instances when the thermoelectric current is measured.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

The present system may include single-contact tunneling nanoscale thermometry apparatus and methods for measuring the temperature of electronically conducting and semiconducting objects of interest. Several benefits of the system may include new ways of measuring temperature differences, miniaturizing testing apparatus and increasing the spatial resolution of measurements across the surface of a test subject. For example, some systems may utilize only one contact lead for thermocouple measurements rather than two leads. The spatial resolution of measurements over a sample may be improved to about 1 nm, or may be scalable to atomic dimensions, for example. Some systems may operate in a regime of very poor thermal contact between the test subject and the contact lead, thus limiting thermal perturbations to the object of interest. Some systems may operate in a regime of very poor electrical contact between the test subject and contact lead, which may be compatible with electronically sensitive test subjects. For example, electrical shorts or extra electrical loading between the test subject and contact lead may be avoided. Moreover, thermal properties of a tunnel junction (heat flow) may be determined independently and complementary to the electronic properties (electron current flow). Therefore the changes in either electronic or thermal properties may be determined independently from each other. Further advantages may include self-calibrating systems, for example, a temperature measurement may be made without prior temperature calibration even though a response is measured as a function of temperature. Some systems may be electronically self-sensing, where the integrity of the thermal-measuring circuit may be determined to be reliable in a matter of seconds without making structural modifications to the system. The present system may be compatible with most existing scanning methods and lithography techniques and may apply to junctions from nanometers to microns wide.

A system for single-contact tunneling thermometry may include a subject material, a single measurement lead and an electron tunnel junction formed between the subject material and the measurement lead. The subject material may be an object for which temperature information is desired. In some systems, a temperature difference or temperature gradient between the subject material and the single measurement lead may be determined. When a temperature gradient is induced across the tunnel junction, a thermovoltage across the tunnel junction (or a thermoelectric current running through the tunnel junction) may be measured and may be used as a reference. An alternating voltage ($V_{AC}$) may be applied across the tunnel junction while simultaneously measuring total voltage (or total current) across the tunnel junction. The alternating voltage may impart a constant rectification voltage (or rectification current) across the tunnel junction. The magnitude of the applied alternating voltage may be increased until a total voltage (or total current) across the tunnel junction either nullifies or doubles relative to the thermovoltage (or thermoelectric current) measured at zero applied alternating voltage. A mathematical relationship between the desired temperature gradient information and the magnitude of the alternating voltage that corresponds with the nullification or doubling of the measured thermovoltage (or thermoelectric current) may be utilized to determine the temperature gradient information for the tunnel junction between the subject material and the single measurement lead. In some systems, a feedback loop may be included that may automatically vary the applied alternating voltage and apply a mathematical formula to determine the temperature gradient information.

Figure 1:
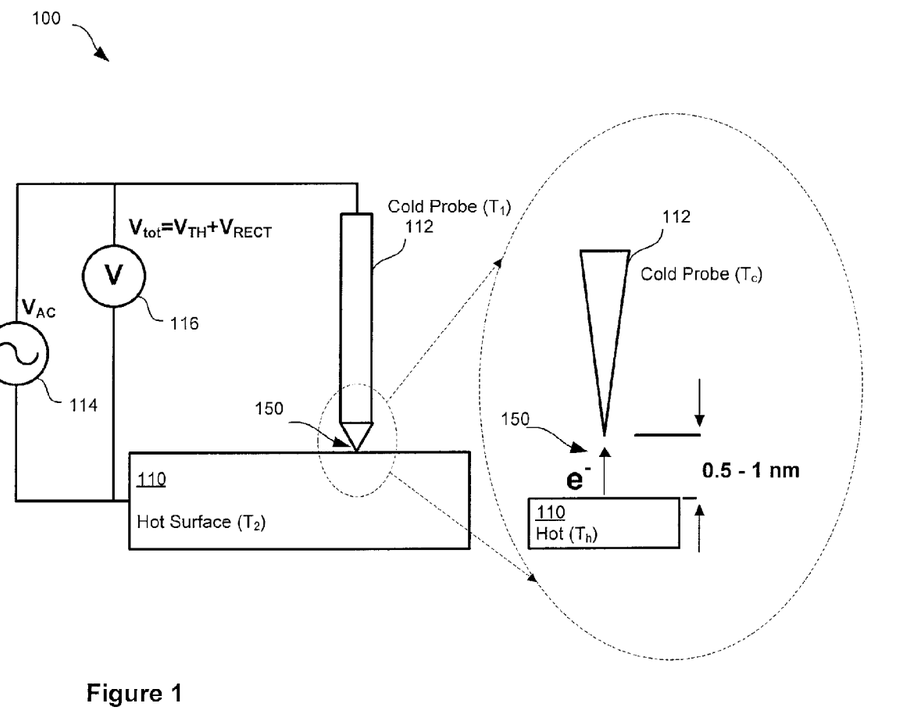
FIG. 1 is a system for determining temperature difference across an electron tunnel junction between a subject material and a probe where the temperature difference may be determined based on a voltage measurement in a circuit which is excited by a small alternating voltage (AC).
Figure 2:
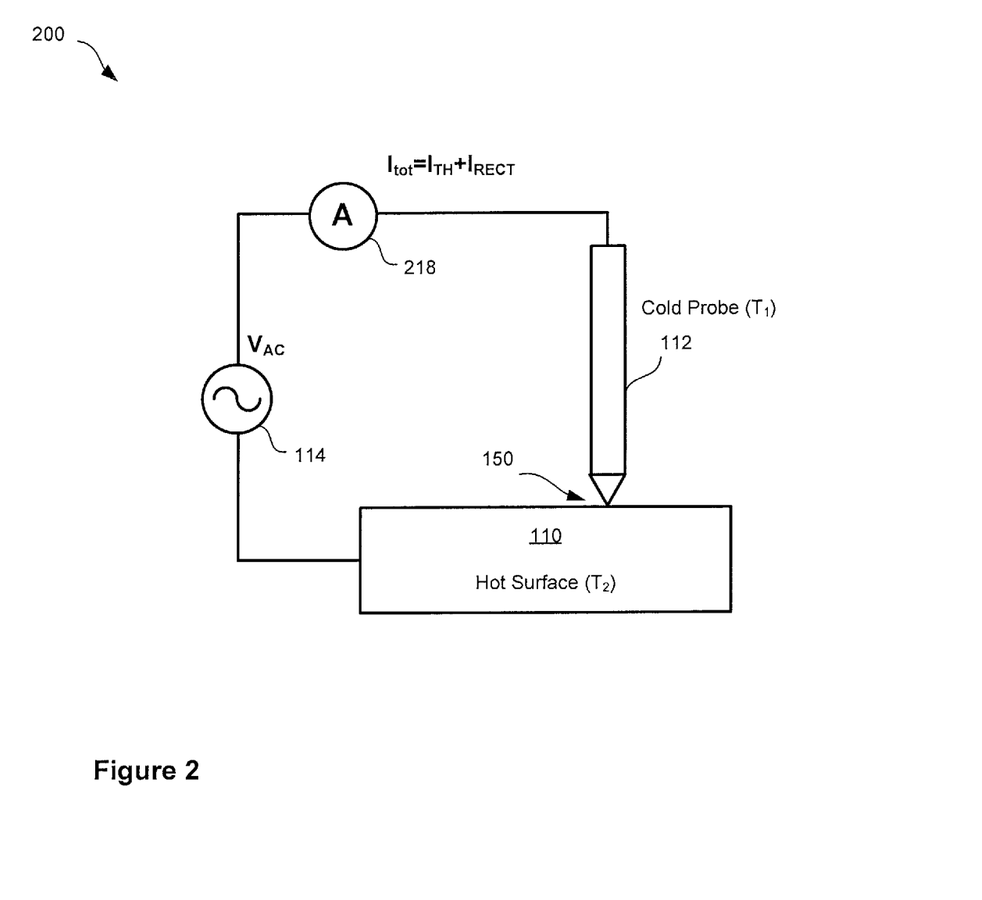
FIG. 2 is a system for determining a temperature difference across an electron tunnel junction between a subject material and a probe where the temperature difference may be determined based on a current measurement in a circuit connecting the subject material and the probe, and where the circuit may be excited by a small AC voltage.
Figure 3:
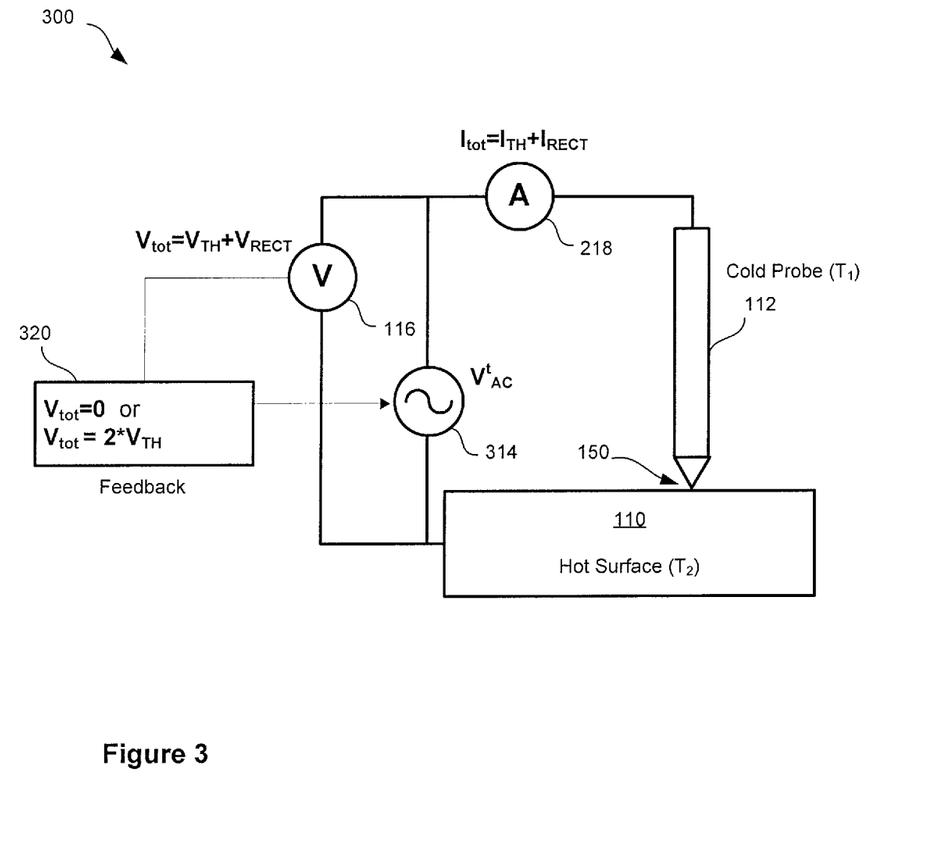
FIG. 3 is a system for determining a temperature difference across an electron tunnel junction between a subject material and a probe where the temperature difference may be determined automatically utilizing a feedback circuit, based on either a voltage measurement or a current measurement in a circuit connecting the subject material and the probe, and where the circuit may be excited by a small AC voltage.

Three exemplary systems and methods are described with respect to FIGS. 1, 2 and 3 which may be utilized for determining temperature gradient information across an electron tunnel junction based on an applied alternating electrical excitation. However, this determination is not limited to any specific method or system, and any suitable method or system may be utilized to determine the temperature gradient information across the tunnel junction based on the applied electrical excitation.

FIG. 1 is a system for determining temperature difference across an electron tunnel junction between a subject material and a probe where the temperature difference may be determined based on a voltage measurement in a circuit connecting the subject material and the probe, and where the circuit may be excited by an alternating voltage (AC) which may have a small magnitude of about 1-100 mV, however, the magnitude is not limited to these specific values. Referring to FIG. 1, there is shown a system 100 which may be a circuit including a test subject 110, a probe 112, a voltmeter 116 and an alternating voltage source ($V_{AC}$) 114. Between the test subject 110 and the probe 112 there may be a gap comprising an electron tunnel junction 150. The electron tunnel junction 150 may be referred to herein as the tunnel junction 150 or the junction 150.

The probe 112 may comprise a measurement lead, for example, a sharp metal tip or a wire, or a capacitor plate, or an electrode or any other reasonably good electronic conductor. The test subject 110 may be an object, for example, with a relatively flat surface made of metallic or semiconductor material. The probe 112 may be positioned near the test subject 110 such that a nanoscale tunnel junction 150 is established between the probe and test subject. In some systems, the temperature of either or both of the probe 112 and the test subject 110 may be controlled. For example, the test subject 110 may be heated or its temperature may vary based on conditions in its environment. In some exemplary systems, the test subject 110 may be heated by a laser or a heater. In some systems, physical operating conditions or biochemical processes may vary the temperature of the test subject 110. However, the system is not limited with regard to how the test subject 110 is heated and any suitable method or condition may be utilized. Similarly, the temperature of the probe 112 may be controlled and any suitable method may be utilized to control the temperature. In some systems the probe 112 may be held at a reference temperature by a heat bath. For example, the probe 112 may be held at room temperature while the test subject 110 may be heated with a heater. Although FIG. 1 shows the test subject 110 as a hot surface and the probe 112 as cold, the temperature of the probe 112 may be higher or lower than the test subject 110. When a temperature gradient occurs across the tunnel junction 150, it may produce a thermovoltage or thermoelectric current signal across the tunnel junction 150.

The electron tunnel junction 150 may act as a sensor for temperature measurements. The lateral size of the tunnel junction 150 may be as small as an atomic dimension, (for example, as in molecular break junctions, nanocapacitors and scanning tunneling microscopy) or may be up to several micrometers wide (for example, as in integrated circuits, transistors and macroscopic tunnel junctions). Thus, lateral spatial resolution, down to at least 1 nm or better may be achieved in raster scanned temperature measurements across the surface of the test material 112 using the present technique.

The voltmeter 116 and the alternating voltage source 114 in connected in parallel may be connected across a series of the probe 112, the tunnel junction 150 and the test subject 110.

In operation of the system 100, the electron tunnel junction 150 may be formed between the test subject 112, for which temperature information may be determined, and the single measurement lead or probe 112. A temperature gradient may be induced across the tunnel junction 150. A thermovoltage may develop across the tunnel junction and it may be measured by the voltmeter 116 at zero applied alternating voltage ($V_{AC}$) of the alternating voltage source 114, to be used as a reference thermovoltage. An alternating voltage excitation may be applied across the tunnel junction 150, by increasing the magnitude of the alternating voltage source 114. The applied AC voltage may create a direct current (DC) rectification voltage component across the tunnel junction 150. The magnitude of the alternating voltage from the source 114 may be increased while the voltmeter 116 simultaneously measures the thermovoltage ($V_{TH}$) plus the DC rectification voltage ($V_{RECT}$) across the tunnel junction 150. The sum of the measured $V_{TH}$ and $V_{RECT}$ may be referred to as the total measured voltage ($V_{tot}$).

The magnitude of the applied alternating voltage may be increased until a target applied alternating voltage ($V^t_{AC}$) is reached. The target alternating voltage may occur when the measured total voltage (sum of the thermovoltage and the DC rectification voltage) either nullifies or reaches double the reference thermovoltage which is measured at zero alternating voltage excitation from the alternating voltage source 114.

One may determine whether to nullify or double the reference thermovoltage (measured at zero $V_{AC}$ excitation), to find the target applied alternating voltage $V^t_{AC}$, based on properties of the tunnel junction 150 and/or the direction of the temperature gradient across the tunnel junction. The direction of the temperature gradient may depend on whether the probe 112 is hotter or colder than the measured test subject 110. In instances when the DC rectification voltage is opposite in sign to the measured thermovoltage, the target applied alternating voltage $V^t_{AC}$ form the source 114 may be determined by nullifying the reference thermovoltage using the DC rectification voltage. In instances when the applied rectification voltage has the same sign as the induced thermovoltage, the target applied alternating voltage $V^t_{AC}$ form the source 114 may be determined when the measured total voltage reaches double the reference thermovoltage measured as zero excitation from the alternating voltage source 114.

Once the target applied alternating voltage $V^t_{AC}$ is determined, a mathematical formula which relates the temperature difference between the test subject and the probe to the applied alternating voltage (equation 4 below) may be applied to the magnitude of the target applied alternating voltage $V^t_{AC}$ to determine the temperature difference between the probe 112 and the test subject 110. In instances when the temperature of one element such as the probe 112 is known, a specific value for the temperature difference between the test subject 110 and the probe 112 may be determined. Otherwise, a relative temperature difference may be determined. This method may apply to an electrical resistance across the electron tunnel junction of up to, at least, 10 MΩ.

FIG. 2 is a system for determining a temperature difference across an electron tunnel junction between a test subject material and a probe where the temperature difference may be determined based on a current measurement in a circuit connecting the test subject material and the probe, and where the circuit may be excited by alternating voltage (AC) which may have a small magnitude of about 1-100 mV however, the magnitude is not limited to these specific values. Referring to FIG. 2, there is shown a system 200 which may be a circuit including the test subject 110, the probe 112, an amp meter 218 and the alternating voltage source ($V_{AC}$) 114. Between the test subject 110 and the probe 112 there may be a gap comprising the electron tunnel junction 150.

The system 200 shown in FIG. 2 comprises the alternating voltage source 114, the amp meter 218, the probe 112 and test subject 110 connected in series with the tunnel junction 150. The probe 112, the test subject 110, the tunnel junction 150 and the alternating voltage source 114 are described with respect to FIG. 1.

In operation of the system 200, for single-contact tunneling thermometry, the electron tunnel junction 150 may be formed between the test subject 110 and the probe 112. A temperature gradient may be induced across the electron tunnel junction 150. A reference thermoelectric current across the electron tunnel junction 150 may be measured in the amp meter 218 at zero applied alternating voltage ($V_{AC}$) of the alternating voltage source 114. An alternating voltage may be applied across the tunnel junction 150 by the alternating voltage source 114 which may create a DC rectification current component in the measured current across the tunnel junction 150. The total current $I_{tot}$ including the thermoelectric current ($I_{TH}$) and the DC rectification current ($I_{RECT}$) across the tunnel junction 150 may be measured by the amp meter 218 while the magnitude of alternating voltage applied by the VAC source 114 is increased. The magnitude of alternating voltage may be increased until a target applied alternating voltage $V^t_{AC}$ is determined. $V^t_{AC}$ may be reached when the thermoelectric current $I_{TH}$ plus the DC rectification current $I_{RECT}$ across the electron tunnel is nullified or doubled in value relative to the reference thermoelectric current measured at zero applied alternating voltage.

Once the target applied alternating voltage $V^t_{AC}$ is determined, a mathematical formula which relates the temperature difference between the test subject 110 and the probe 112 to the applied alternating voltage (equation 4 below) may be applied to the magnitude of the target applied alternating voltage $V^t_{AC}$ to determine a temperature difference across the tunnel junction. In instances when the temperature of one element such as the probe 112 is known, a value for the temperature difference between the test subject 110 and the probe 112 may be determined. Otherwise a value proportional to the temperature difference may be determined. This method may apply to an electrical resistance across the electron tunnel junction of up to, at least, 1 TΩ.

FIG. 3 is a system for determining a temperature difference across an electron tunnel junction between a subject material and a probe where the temperature difference may be determined automatically utilizing a feedback circuit, based on either a voltage measurement or a current measurement in a circuit connecting the test subject material and the probe, and where the circuit may be excited by a small AC voltage. For example, the system 300 shown in FIG. 3 may represent automation of either or both of the system 100 and the system 200 utilizing a feedback circuit. Referring to FIG. 3, there is shown a system 300 which may be a circuit including a test subject 110, a probe 112, a voltmeter 116, an amp meter 218, an alternating voltage source ($V_{AC}$) 114 and a feedback circuit 320. Between the test subject 110 and the probe 112 there may be a gap comprising an electron tunnel junction 150. The electron tunnel junction 150 may be referred to herein as the tunnel junction 150 or the junction 150.

The system 300 shown in FIG. 3 comprises the alternating voltage source 114, the amp meter 218, the probe 112 and test subject 110 connected in series with the tunnel junction 150. The probe 112, the test subject 110, the tunnel junction 150, the voltmeter 116 and the alternating voltage source 114 are described with respect to FIG. 1. The amp meter 218 is described with respect to FIG. 2.

The feedback circuit 320 may comprise hardware and/or software that may perform steps that determine a target applied alternating voltage ($V^t_{Ac}$) based on nullification or doubling of a reference thermovoltage in a measured total voltage ($V_{TOT}=V_{TH}+V_{RECT}$) as described with respect to FIG. 1. In this regard, the feedback circuit may read voltage measurements from the voltmeter 116 and may control increasing of the magnitude of the alternating voltage output from the $V_{AC}$ source 114. Moreover, the feedback circuit may be operable to determine whether to nullify or double the reference thermovoltage to determine $V^t_{AC}$ by determining the sign of the reference thermovoltage from the voltmeter 116 and/or the sign of the rectification voltage created by the alternating voltage source 114.

Similarly, the feedback circuit 320 may comprise hardware and/or software that may perform steps that determine a target applied alternating voltage ($V_{AC}$) based on nullification or doubling of a reference thermoelectric current in a measured total current ($I_{TOT}=I_{TH}+I_{RECT}$) as described with respect to FIG. 2. In this regard, the feedback circuit may read current measurements from the amp meter 118 and may control increasing of the magnitude of the alternating voltage output from the $V_{AC}$ source 114. Moreover, the feedback circuit may be operable to determine whether to nullify or double the reference thermoelectric current to determine $V^t_{AC}$ by determining the sign of the reference thermoelectric current from the voltmeter 116 and/or the sign of the rectification current created by the alternating voltage source 114.

In operation of system 300, a temperature difference may be measured between the test subject 110 and the probe 112 utilizing the tunnel junction 150 by measuring one or both of the total voltage across the junction 150 as the sum of the thermovoltage and the DC rectification voltage ($V_{TOT}=V_{TH}+V_{RECT}$) and the total current crossing the junction 150 as the sum of the thermoelectric current and the DC rectification current ($I_{TOT}=I_{TH}+I_{RECT}$) while simultaneously applying excitation by a small AC voltage. The feedback circuit 320 may read a reference thermovoltage from the voltmeter 116 when the applied alternating voltage from the source 114 is zero. The feedback circuit 320 may determine whether to nullify or double the reference thermovoltage value when measuring the total voltage, based on the sign of the reference thermovoltage. The feedback circuit may increase the magnitude of the alternating voltage and read the total voltage from the voltmeter 116 until the total voltage indicates that $V^t_{AC}$ has been reached. Once the feedback indicates that $V^t_{AC}$ has been reached, $V^t_{AC}$ may be used as a direct measure of the temperature difference across the tunnel junction 150 by applying the mathematical relationship represented in equation 4 below. The temperature of the probe 112 relative to the surface 110 may lower (as shown in FIG. 1) or higher (not shown). Similarly, the feedback circuit 320 may automatically measure a reference thermoelectric current from the amp meter 216 when applying zero $V_{AC}$ and may determine $V^t_{AC}$ by increasing $V_{AC}$ and nullifying or doubling the reference thermoelectric current value based on the sign of thermoelectric current at zero $V_{AC}$. $V^t_{AC}$ may be used as a direct measure of the temperature difference across the tunnel junction 150 by applying the mathematical relationship represented in equation 4 below.

The present system described with respect to FIGS. 1, 2 and 3, provides alternative nanoscale thermometry apparatus and methods for measuring the temperature of electronically conducting and semiconducting objects. It may resolve many fundamental deficiencies of previous methodologies and introduces new possibilities for both measurement and miniaturization. Specifically, the present system (1) may utilize only one contact lead such as the probe 112, rather than two utilized in other thermocouple measurements. Moreover, the present system (2) may operate in a regime of very poor thermal contact, introducing a perturbation only on the object of interest such as the test subject 110. Moreover, the present system (3) may operate in a regime of very poor electrical contact and thus may be compatible with electronically sensitive objects without causing electrical shorts or extra electrical loading. Moreover, the present system (4) may provide at least a 1 nm spatial resolution, laterally across a measured surface, and may be potentially scalable to atomic dimensions. Moreover, the present invention (5) may enable decoupling of thermal properties of a tunnel junction (heat flow) from its electronic properties (electron current flow). Moreover, the present invention (6) may provide the advantage of being self-calibrating. In this regard, the temperature measurement may not require prior temperature calibration, where the sensor response is measured as a function of temperature. Moreover, another advantage lies in that the present invention (7) may be electronically self-sensing, for example, the integrity of the thermally-measuring circuit may be checked for reliability in a matter of seconds without structural modifications. Moreover, the present invention (8) may be compatible with most existing scanning methods, lithography techniques and may apply to junctions with lateral dimensions from several nanometers wide to microns wide.

The sensor of the temperature measurement method may be an electron tunnel junction 150, formed between an object of which a temperature is to be measured 110 (which may be a metal or semiconductor) and a single measurement lead 110 (which can be a metal wire). The size of the tunnel junction 150 may be as small as atomic dimensions (e.g. in molecular break junctions, nanocapacitors, scanning tunneling microscopy), as schematically shown in FIG. 1, and up to several micrometers (including most integrated circuits, transistors, macroscopic tunnel junctions). Thus, a spatial resolution down to at least 1 nm or better may be achieved in temperature measurements using the present technique. A temperature gradient across the tunnel junction 150 may produce a thermovoltage or thermocurrent signal, which may be measured as described with respect to FIGS. 1, 2 and 3.

Thermal and electronic properties of the tunnel junction 150 may be fundamentally different in several respects from those of a bi-metallic junctions usually employed in thermocouples. As a result, a systematic application of tunnel junctions as temperature sensors may be distinct and in several aspects, advantageous over traditional methods. Specifically, one example of an advantage in the application of tunnel junctions for measuring temperature differences may include localization of a thermal gradient. In a traditional thermocouple the thermal gradient may be established between two opposite ends of the measurement wires. The distance between a hot end and a cold end may be, therefore, much larger than the measured (heat) contact itself. At the same time, the thermovoltage signal may originate from a difference in the overall thermopower of one measurement wire and its couple. In contrast, in a tunneling thermovoltage measurement, the temperature drops primarily across a tunnel junction (such as the tunnel junction 150 shown in FIG. 1). The thermal gradient is therefore localized on the same (nanoscale) region as the measured contact itself, and the thermovoltage may originate from within this nanoscale region (while the contribution of the macroscopic wires may be comparatively small).

Another advantageous property of a tunnel junction when used for measuring a temperature difference may include the thermal resistance of the tunneling contact. The thermal resistance of a tunnel junction such as the tunnel junction 150 may be many orders of magnitude smaller than that of a direct metal-to-metal, or metal-to-semiconductor contact (such as contacts upon which traditional thermocouples and miniature versions thereof in scanning thermal microscopy (SThM) rely). Therefore the tunneling contacts may least perturb smaller measured objects (which may be particularly important for dimensions <50 nm), and sensor leads may not have to thermally equilibrate with the measured object of interest.

Another advantageous property of tunnel junctions for measuring temperature differences may include the electrical resistance of a tunneling contact. The electrical resistance of a tunnel junction such as the tunnel junction 150, may be many orders of magnitude larger than that of a direct metal-to-metal or metal-to-semiconductor contact. This property may reduce the electronic perturbation of the measured object, and may eliminate shorting and/or resistive and inductive loading for the temperature measurement procedure. Moreover, the resistance of a tunneling contact, typically, may be the largest resistance in the overall circuit by many orders of magnitude (and may be made so if otherwise). Therefore, a macroscopic potential applied to the tunneling circuit may drop predominantly across the tunneling junction (irrespective of its overall dimensions). As discussed herein below, this is a critically important enabling property for self-sensing, self-calibrating and accurate implementation of the tunneling thermometry concept.

Based on the thermal and electronic properties of a tunnel junction, in traditional procedures, a calibration of tunneling thermovoltage as a function of a macroscopic temperature difference $\Delta T = T_1 - T_2$ where temperatures $T_1$ and $T_2$ are measured at a macroscopic distance away from the tunnel junction, as may be done in conventional thermocouples, may be inaccurate. That may be because such a calibration assumes the equivalence of the macroscopic temperatures ($T_1$, $T_2$) and local nanoscale tunnel junction temperatures ($T_C$, $T_H$) (see for example FIG. 1), specifically the assumption that $T_1=T_C$ and $T_2=T_H$. Therefore the traditional procedure ignores the heat transfer across the tunnel junction. In contrast, the heat transfer across a tunnel junction may not be zero, and may include a predominantly near-field radiative component for vacuum junctions and a predominantly vibrational (or phonon-mediated) component for solid state tunnel junctions. In general both of these processes may lead to the underestimation of ($T_C$ being higher than $T_1$ and/or $T_H$ being lower than $T_2$, FIG. 1), an ensuing underestimation of thermopower and thus a systematic error in the overall temperature measurement.

The present system may directly measure a nanoscale temperature gradient ($\Delta T_{nano}=T_C-T_H$), and therefore may overcome the fundamental disparity described above. The direct measurement may be achieved by combining a thermoelectric signal with a rectification signal, produced by an additional AC-voltage applied to the tunnel junction 150. The combined measurement may be achievable due to the large electrical resistance of the tunnel junction 150. At the same time the new method may decouple thermal and electronic properties of the junction, which may enable a parameter-free (absolute) measurement of the local temperature gradient and may even obviate the need for any temperature calibration.

Analysis of the problem of electronic tunneling in the presence of a heat gradient across the tunnel junction may result in the following expression for the thermovoltage:

$$V_{th} = \frac{\pi^2 k_b^2}{6e}(T_C^2-T_H^2)\left(\frac{1}{\sigma(E)}\frac{\partial \sigma(E)}{\partial E}\right)_{(E_f)} \quad \text{(eq. 1)}$$

Where $\sigma(E)$ is the energy-dependent tunneling conductance, $E_F$ is the Fermi level, $k_B$ is the Boltzmann constant and $e$ is the electron charge.

Because the resistance of the tunnel junction may be much higher than the resistance of the contact leads, the voltage drop across the tunnel junction ($\Delta V$) is equivalent to the energy difference between the electrochemical potentials of the contacts ($\Delta V=e\Delta E$). As a result, eq. 1 may be readily approximated as:

$$V_{th} = \frac{\pi^2 k_b^2}{6e^2}(T_C^2-T_H^2)\left(\frac{1}{\sigma(V)}\frac{\partial \sigma(V)}{\partial V}\right)_{(E_f)} \quad \text{(eq. 2)}$$

where V is an applied bias.

At the same time, when any non-linear conductance, including a tunnel junction, is excited by an AC voltage signal, there appears a DC component of the electrical current, termed rectification current. If the magnitude of the applied AC bias is small, the corresponding DC rectification voltage ($V_{RECT}$) that nullifies the rectification current is:

$$V_{RECT} = \frac{-1}{4}\left(\frac{\partial I(V)}{\partial V}\right)^{-1}\frac{\partial^2 I(V)}{\partial V^2}V_{AC}^2 = \frac{-1}{4}V_{AC}^2\frac{1}{\sigma(V)}\left(\frac{\partial \sigma(V)}{\partial V}\right) \quad \text{(eq. 3)}$$

In carrying out the present invention, we excite the tunnel junction by $V_{AC}$ while the junction is out of thermal equilibrium. $V_{AC}$ is varied until $|V_{RECT}|=|V_{th}|$. We define $V_{AC}^t$ as the magnitude of $V_{AC}$ that satisfies this condition. In this case, the thermovoltage signal will either be nullified or doubled as described with respect to FIG. 1. Likewise, the thermocurrent will either be nullified or doubled, as described with respect to FIG. 2. From eq. 2 and eq. 3, we then obtain the central result:

$$(T_C^2-T_H^2) = \frac{-3e^2}{2\pi^2 k_b^2}(V_{AC}^t)^2 = -2.0467 \cdot 10^7 (V_{AC}^t)^2 \quad \text{eq. (4)}$$

Therefore $V_{AC}^t$ is a direct and parameter-free measure of the temperature difference across the tunneling junction. In instances when $T_C$ is known, $T_H$ may be determined.

Eq. 2, 3 and 4 reveal the intrinsic properties of tunneling thermometry that support the various distinctions set forth hereinabove.

The decoupling of thermal properties of a tunnel junction from its electronic properties as stated above may be supported at least in part by eq. (4), which represents a parameter-free measurement of temperature difference that does not depend on electronic properties of the tunnel junction 150. Therefore, the method of the system may decouple the thermal characteristics of the junction (heat-flow) from its electronic properties (electronic conductance).

The prior noted self-calibrating feature of the present system may likewise be supported, at least in part, by eq. (4), which shows $V_{AC}^t$ as a direct measure of the temperature difference. Therefore the calibration of the sensor as a function of temperature may not be required. Moreover, the sensor may be effectively self-calibrating, and may sustain minor structural deviations of the junction without significantly affecting the measurement result.

In an exemplary system, a calibration measurement was carried out in a specially modified scanning tunneling microscope, where a systematically variable heat gradient may be applied across the tunnel junction 150, and thermovoltage and rectification currents may be measured. Tunneling microscopy may provide an adjustable tunnel junction 150 and may be raster-scanned across the surface of the test subject 110 in a reproducible way. A tunnel junction 150 of the scanning tunneling microscope may be made out of a macroscopic silver surface test subject 110 and a sharp metal-tip probe 112 made of Pt—Ir alloy.

Figure 4:
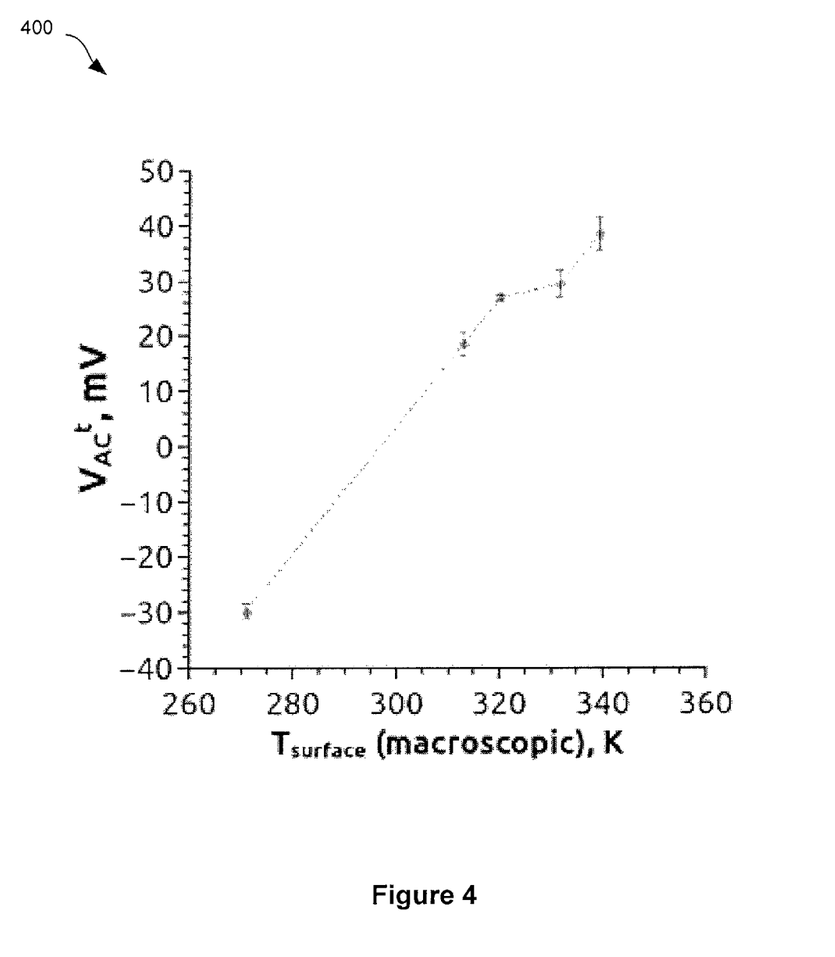
FIG. 4 is a plot of a magnitude of an AC voltage ($V^t_{AC}$) which nullifies a thermovoltage signal across an electron tunnel junction between a subject material and a probe, as a function of a macroscopically measured surface temperature of the subject material.

FIG. 4 is a plot of the magnitude of AC voltages ($V_{AC}^t$) which nullify corresponding thermovoltage signals across an electron tunnel junction between a subject material and a probe, as a function of macroscopically measured surface temperatures of the subject material. It is noted that the probe (which may correspond to the probe 112 may be held at room temperature (approximately 294K) such that the macroscopic temperature of the test material (which may correspond to the test subject 110) may range below and above the temperature of the probe.

Referring to FIG. 4, $V_{AC}^t$ values were extracted from a series of measurements as a function of varying macroscopic surface temperature. In each case, the macroscopic temperature of a silver crystal surface was either raised or lowered relative to the macroscopic temperature of the probe tip, which was in contact with a large heat bath at $T\approx 294K$. At each macroscopic temperature of the surface, five to ten tunnel junction measurements were taken at randomly selected locations of the test subject surface. $V_{AC}^t$ was determined and is shown to scale (approximately linearly) with the macroscopic temperature of the surface. In this case, the thermal transfer across the tip-surface tunnel junction was minimized by doing the measurements in an ultrahigh vacuum environment and making the tip-surface tunnel junction significantly smaller than the dimensions of the contact leads (thereby maximizing the heat resistance of the tunnel junction, and enabling each of the leads to be at thermal equilibrium). As a result, we may assume that the nanoscopic heat gradient may be sufficiently well approximated by direct macroscopic temperature measurements.

Figure 5:
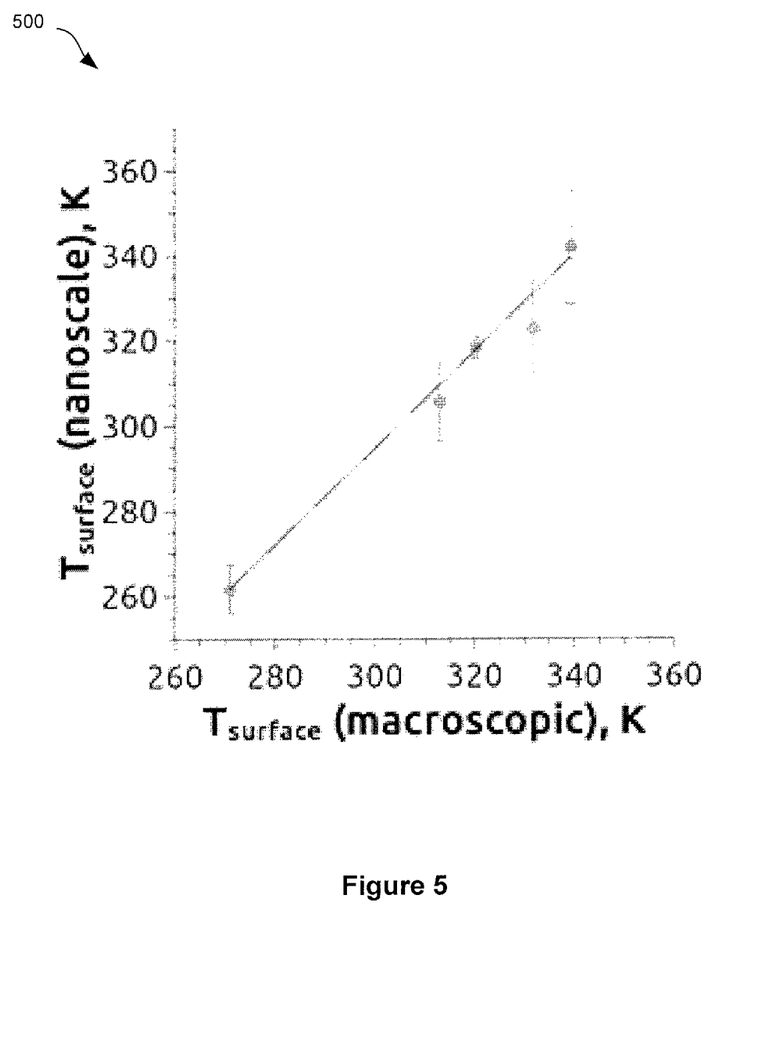
FIG. 5 is a plot of temperatures of a subject material surface obtained from direct macroscopic temperature measurements versus temperatures of the subject material surface measured using single-contact tunneling thermometry in accordance with examples of the present system.

FIG. 5 is a plot of experimental temperatures of a test material surface obtained from direct macroscopic temperature measurements along the horizontal axis versus temperatures of the test material surface as measured using single-contact tunneling thermometry in accordance with examples of the present system along the vertical axis. The temperature of a probe in this measurement (corresponding to the probe 112) is held at constant room temperature (approximately 294K). The nanoscale temperature of the test surface (corresponding to the test subject 110) is measured by positioning the probe over the surface of the test material while applying an alternating voltage.

Referring to FIG. 5, the temperature of the test surface obtained from a direct macroscopic temperature versus the temperature of the surface measured using tunneling thermometry is shown. Here, the nanoscopic temperature difference was first calculated from using eq. (4) and using the data from FIG. 4. Next the nanoscale temperature of the surface was calculated assuming the nanoscale tip temperature of 294 K. Agreement between a nanoscale and macroscopic temperatures of the surface may be indicated.

Measurement errors shown in FIG. 5 may be accounted for by an intrinsic error in a macroscopic measurement (the macroscopic thermocouple may not be in direct contact with the sample), and a somewhat limited bandwidth of the rectification measurements in the employed set-up. Both are specific to our demonstration and may be resolved by improving the wiring and configuration of the set-up. The deviations of the two values at larger temperature gradients may indicate either non-zero heat transfer across the tunnel junction or systematic inaccuracies in macroscopic measurements. Both may reaffirm a need for a nanoscale approach for thermal characterization.

With regard to application geometries, the concept of tunneling thermometry may be applicable to any tunnel junction where the heat gradient across the tunneling barrier may exist or may be applied. Moreover, the basic physics may also be realized in Schottky barriers. The system described herein may therefore also apply to semiconductor diodes from nanoscale to macroscopic dimensions.

An example of an application of the present invention is a scanning probe-based set-up, which comprises a moving tip (lead 1) and a stationary surface (lead 2). The junction between lead 1 and lead 2 may be a vacuum tunnel junction (as in scanning tunneling microscopy) or a contact tunnel junction (as in conductive atomic force microscopy), or a contact Schottky diode (formed between a metal tip and a semiconductor surface).

Other examples of applications of the present invention may include junctions defined by lithography, mechanical breaking, sputter deposition, growth or self-assembly methodologies. The junction may be all solid state (e.g. metal-oxide-metal), or metal-semiconductor, vacuum (metal-vacuum-metal), or molecular (metal-molecule(s)-metal). Both metal and semiconducting leads may be used. Further examples of applications of the present invention may include single-wire non-contact thermometry of any conducting object, including lithographically-defined conductors. Further examples of applications of the present invention may include cross-bar arrays and junctions, where heat distribution could be used for systems optimization and failure analysis.

While various embodiments of the system have been described, it will be apparent to those of ordinary skill in the art that many more embodiments and implementations are possible within the scope of the invention. Accordingly, the invention is not to be restricted except in light of the attached claims and their equivalents.

I claim:

1. A method of single-contact tunneling thermometry, the method comprising:
   in a circuit including a first object comprising a conductor, a second object that comprises a conductive test subject, and a junction formed in series between the first object and the second object, wherein the junction is a nanoscale tunnel junction:
      applying an alternating voltage across the tunnel junction between the first object and the second object and determining a target alternating voltage applied across the tunnel junction wherein a magnitude of the target alternating voltage is indicated by a measured voltage across the tunnel junction or a measured current crossing the tunnel junction; and
      determining temperature difference information across the tunnel junction based on a relationship between the magnitude of the target alternating voltage applied across the tunnel junction and the temperature difference information across the tunnel junction.

2. The method of claim 1 wherein a thermal gradient is induced across the tunnel junction.

3. The method of claim 1 further comprising, measuring a reference thermovoltage or a reference thermoelectric current crossing the tunnel junction when zero alternating voltage is applied across the tunnel junction.

4. The method of claim 3 further comprising:
   applying an alternating voltage across the tunnel junction while simultaneously measuring one of:
      total voltage across the tunnel junction wherein the total voltage across the tunnel junction includes a thermovoltage component and a direct current (DC) rectification voltage component created by the applied alternating voltage; or
      total current crossing the tunnel junction wherein the total current crossing the tunnel junction includes a thermoelectric current component and a DC rectification current component created by the applied alternating voltage.

5. The method of claim 4 further comprising:
   increasing the magnitude of the applied alternating voltage to reach the target alternating voltage, wherein the target alternating voltage is reached when one of:
      the thermovoltage component is nullified by the DC rectification voltage component;
      the thermovoltage component plus the DC rectification voltage component is double the reference thermovoltage;
      the thermoelectric current component is nullified by the DC rectification current component; and
      the thermoelectric current component plus the DC rectification current component is double the reference thermoelectric current.

6. The method of claim 5 further comprising, utilizing the sign of the reference thermovoltage to determine whether to nullify or double the reference.

7. The method of claim 5 further comprising, utilizing the sign of the reference thermoelectric current to determine whether to nullify or double the reference thermoelectric current.

8. The method of claim 1 wherein a voltmeter is attached across the first object and the second object and the tunnel junction formed between the first object and the second object and is operable to measure voltage across the tunnel junction.

9. The method of claim 1 wherein an amp meter is attached in the circuit comprising the first object and the second object and the tunnel junction formed between the first object and the second object and is operable to measure current crossing the tunnel junction.

10. The method of claim 1 further comprising:
determining the temperature difference information across the tunnel junction by a feedback loop, wherein the determining the temperature difference by the feedback loop comprises:
reading a reference thermovoltage across the tunnel junction when zero alternating voltage is applied across the tunnel junction;
applying an alternating voltage with increasing magnitude across the tunnel junction while simultaneously reading a total voltage across the tunnel junction;
determining the target alternating voltage which corresponds to the total voltage across the tunnel junction that either nullifies the reference thermovoltage or doubles the reference thermovoltage; and
determining the temperature difference information across the tunnel junction based on the relationship between the magnitude of the target alternating voltage and the temperature difference information across the tunnel junction, wherein the feedback loop determines whether to nullify or double the reference thermovoltage based on a sign of the reference thermovoltage.

11. The method of claim 1 further comprising:
determining the temperature difference information across the tunnel junction by a feedback loop, wherein the determining the temperature difference by the feedback loop comprises:
reading a reference thermoelectric current crossing the tunnel junction when zero alternating voltage is applied across the tunnel junction;
applying an alternating voltage with increasing magnitude across the tunnel junction while simultaneously reading a total current crossing the tunnel junction;
determining the target alternating voltage which corresponds to the total current crossing the tunnel junction that either nullifies the reference thermoelectric current or doubles the reference thermoelectric current; and
determining the temperature difference information across the tunnel junction based on the relationship between the magnitude of the target alternating voltage and the temperature difference information across the tunnel junction, wherein the feedback loop determines whether to nullify or double the reference thermoelectric current based on a sign of the reference thermoelectric current.

12. The method of claim 1 wherein the temperature difference information across the tunnel junction is determined without prior temperature calibration of the circuit.

13. A system for single-contact tunneling thermometry, the system comprising:
one or more circuits, said one or more circuits including a first object that comprises a conductor, a second object that comprises a conductive test subject, and a junction formed in series between the first object and the second object, wherein the junction is a nanoscale tunnel junction, said one or more circuits are operable to:
apply an alternating voltage across the tunnel junction between the first object and the second object and determine a target alternating voltage applied across the tunnel junction wherein a magnitude of the target alternating voltage is indicated by a measured voltage across the tunnel junction or a measured current crossing the tunnel junction; and
determine temperature difference information across the tunnel junction based on a relationship between the magnitude of the target alternating voltage applied across the tunnel junction and the temperature difference information across the tunnel junction.

14. The system of claim 13 wherein a thermal gradient is induced across the tunnel junction.

15. The system of claim 13 wherein said one or more circuits are operable to, measure a reference thermovoltage across the tunnel junction or a reference thermoelectric current crossing the tunnel junction, when zero alternating voltage is applied across the tunnel junction.

16. The system of claim 15 wherein said one or more circuits are operable to:
apply an alternating voltage across the tunnel junction while simultaneously measuring one of:
the total voltage across the tunnel junction wherein the total voltage across the tunnel junction includes a thermovoltage component and a DC rectification voltage component created by the applied alternating voltage; or
the total current crossing the tunnel junction wherein the total current crossing the tunnel junction includes a thermoelectric current component and a DC rectification current component created by the applied alternating voltage.

17. The system of claim 16 wherein said one or more circuits are operable to:
increase the magnitude of the applied alternating voltage to reach the target alternating voltage, wherein the target alternating voltage is reached when one of:
the thermovoltage component is nullified by the DC rectification voltage component;
the thermovoltage component plus the DC rectification voltage component is double the reference thermovoltage;
the thermoelectric current component is nullified by the DC rectification current component; and
the thermoelectric current component plus the DC rectification current component is double the reference thermoelectric current.

18. The system of claim 17 wherein said one or more circuits are operable to utilize the sign of the reference thermovoltage to determine whether to nullify or double the reference thermovoltage.

19. The system of claim 17 wherein said one or more circuits are operable to utilize the sign of the reference thermoelectric current to determine whether to nullify or double the reference thermoelectric current.

20. The system of claim 13 wherein a voltmeter is attached across the first object and the second object and the tunnel junction formed between the first object and the second object and is operable to measure voltage across the tunnel junction.

21. The system of claim 13 wherein an amp meter is attached in the circuit comprising the first object and the second object and the tunnel junction formed between the first object and the second object and is operable to measure current crossing the tunnel junction.

22. The system of claim 13 wherein said one or more circuits are operable to:

determine the temperature difference information across the tunnel junction by a feedback loop, wherein the feedback loop is operable to:
  read a reference thermovoltage across the tunnel junction when zero alternating voltage is applied across the tunnel junction;
  apply an alternating voltage with increasing magnitude across the tunnel junction while simultaneously reading a total voltage across the tunnel junction;
  determine the target alternating voltage which corresponds to the total voltage across the tunnel junction that either nullifies the reference thermovoltage or doubles the reference thermovoltage; and
  determine the temperature difference information across the tunnel junction based on the relationship between the magnitude of the target alternating voltage and the temperature difference information across the tunnel junction, wherein the feedback loop determines whether to nullify or double the reference thermovoltage based on a sign of the reference thermovoltage.

23. The system of claim 13 wherein said one or more circuits are operable to:
  determine the temperature difference information across the tunnel junction by a feedback loop, wherein the feedback loop is operable to:
    read a reference thermoelectric current crossing the tunnel junction when zero alternating voltage is applied across the tunnel junction;
    apply an alternating voltage with increasing magnitude across the tunnel junction while simultaneously reading a total current crossing the tunnel junction;
    determine the target alternating voltage which corresponds to the total current crossing the tunnel junction that either nullifies the reference thermoelectric current or doubles the reference thermoelectric current; and
    determine the temperature difference information across the tunnel junction based on the relationship between the magnitude of the target alternating voltage and the temperature difference information across the tunnel junction, wherein the feedback loop determines whether to nullify or double the reference thermoelectric current based on a sign of the reference thermoelectric current.

24. The system of claim 13 wherein the temperature difference information across the tunnel junction is determined without prior temperature calibration of the one or more circuits.

* * * * *